(12) United States Patent
Wodicka, III

(10) Patent No.: US 12,565,324 B2
(45) Date of Patent: *Mar. 3, 2026

(54) AIRCRAFT HOTAS THROTTLE COVER

(71) Applicant: Government of the United States, as represented by the Secretary of the Air Force, Wright-Patterson AFB, OH (US)

(72) Inventor: Emil Wodicka, III, APO, AE (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/951,190

(22) Filed: Nov. 18, 2024

(65) Prior Publication Data

US 2025/0074615 A1 Mar. 6, 2025

Related U.S. Application Data

(63) Continuation of application No. 18/454,458, filed on Aug. 23, 2023, now Pat. No. 12,221,220.

(51) Int. Cl.
*B64D 31/04* (2006.01)

(52) U.S. Cl.
CPC ..................................... *B64D 31/04* (2013.01)

(58) Field of Classification Search
CPC ............................. B64D 31/04; B64D 45/0031
See application file for complete search history.

(56) References Cited

U.S. PATENT DOCUMENTS

| | | | | | |
|---|---|---|---|---|---|
| 3,699,787 | A | * | 10/1972 | Corrado | B64D 45/0031 70/58 |
| 5,582,363 | A | * | 12/1996 | Davis | E05B 67/383 70/183 |

* cited by examiner

*Primary Examiner* — Richard G Davis
(74) *Attorney, Agent, or Firm* — AFMCLO/JAZ; Larry L. Huston

(57) ABSTRACT

A flexible cover for an aircraft hands on stick and throttle. The cover has a top layer and bottom layer joined by a grid having a particular grid density range and Shore A hardness range providing flexibility in cold climates and frictional grip to remain on the throttle in hot climates. The cover has an irregular perimeter, matched to the irregular perimeter of the particular throttle of the aircraft. The cover may have an indicium to assist in proper placement on the throttle. The cover is unitary and fits in the map case of the cockpit.

20 Claims, 7 Drawing Sheets

AIRCRAFT HOTAS THROTTLE COVER

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to unitary protective covers for a specific aircraft HOTAS throttle and more particularly to such covers for a specific aircraft HOTAS having and having a grid intermediate an inner surface and outer surface.

BACKGROUND OF THE INVENTION

Hands On Throttle-And-Stick (HOTAS) is the name given to the concept of placing buttons and switches on the throttle lever and flight control stick in an aircraft cockpit, allowing pilots to access vital cockpit functions and fly the aircraft without having to remove their hands from the throttle and flight controls. HOTAS was originally applied to military aircraft, starting with the British interceptor aircraft, the English electric Lightening, in the late 1950s. The concept quickly spread to numerous other aircraft, such as the General Dynamics F-16 Fighting Falcon, Mikoyan MIG-29, and Eurofighter Typhoon. Application of the concept was further pioneered with the Ferranti AIRPASS radar and gunsight control system used by the English Electric Lightning. HOTAS is widely used on all modern fighter aircraft such as the F-16 Fighting Falcon, the A-10A/A-10C, F35, F22, F15 and civilian aircraft.

Referring to FIG. 1, having all necessary switches on the stick and throttle allows the pilot to keep both "hands on throttle-and-stick," thus allowing focus to remain on more important duties than looking for controls on a dashboard. The HOTAS throttle has a proximal end extending outwardly from a cowl and a distal end upwardly cantilevered therefrom.

The goal is to improve pilots' situational awareness, their ability to manipulate switch and button controls in turbulence, under stress, or during high G-force maneuvers, to improve reaction time, to minimize instances when hands must be removed from one or the other of the aircraft's controls to use another aircraft system, and reduce total time spent doing so.

But with the benefits of HOTAS come tradeoffs. The buttons and switches on the throttle are fragile. The buttons and switches can become dislodged—and even broken—by crew and maintenance workers moving about in the cockpit. Repairs can take from 5 hours to 16 hours, during which time the aircraft is out of service.

The single engine, single seat F35 is the $5^{th}$ generation fighter of the US Air Force and features a helmet mounted display system for the pilot. The F35 aircraft is supplied by Lockheed Martin corporation of Bethesda, MD in three models: F-35A Lightening II; F-35B Lightening II and F-35 Lightening II as described at https://www.f35.com/f35/about.html and https://www.af.mil/About-Us/Fact-Sheets/Display/Article/478441/f-35a-lightning-ii/, the disclosures of which are incorporated herein by reference.

The F-35 Joint Strike Fighter Throttle Grip is machined from a high-strength aluminum alloy casting. The throttle contains a transducer, optical encoder and several single and multi-function switches. In addition to engine power control, these features allow for display cursor control, menu scroll/select, speed brakes, countermeasures, communications and weapons system functions as disclosed in one embodiment by https://wraithsystems.com/details-f-35-throttle/, the disclosure of which is incorporated herein by reference.

Various covers have been proposed for HOTAS throttles. For example, one attempt in the art employed a clamshell that encases the throttle with two rigid halves joined by a hinge. Various hinges have been tried. But this cover necessitates extra hardware pieces, which were prone to detaching and posed a significant foreign object debris risk in the cockpit. Another attempt in the art was fabric covers. But the fabric covers did not provide protection from physical damage. Yet other covers resembled upside-down buckets. These covers encase the control to prevent physical damage. But this solution yields a single piece having a bulky size which prevents the cover from being stored in the cockpit, leading to delayed installation.

Accordingly, this invention addresses the problem of providing a one-piece cover for a HOTAS throttle which protects the throttle from damage, protects the necessary buttons and switches without covering excessive area and can be easily fit into the cockpit during flight without being loose in the cockpit.

SUMMARY OF THE INVENTION

In one embodiment the invention comprises a cover for an F35 HOTAS throttle having a shell, the shell having a top layer defining convex outer surface and a bottom layer defining a concave inner surface opposed thereto and defining an irregular perimeter, the irregular perimeter conforming to a throttle of an F35 aircraft. A grid connects the top layer and the bottom layer.

In another embodiment the invention comprises an F35 aircraft cockpit having an operable HOTAS throttle therein and having a HOTAS throttle for controlling operation of the aircraft without removal of the pilot's hand therefrom, the HOTAS throttle extending upwardly from a proximal end disposed in a cowl to a distal end remote therefrom, the distal end of the of the throttle having a cover removably disposed thereon, the cover comprising a shell, the shell having a top layer defining convex outer surface and a bottom layer defining a concave inner surface opposed thereto and defining an irregular perimeter, the irregular perimeter conforming to a throttle of an F35 aircraft; and a grid connecting the top layer and the bottom layer.

In another embodiment the invention comprises a method of protecting a HOTAS throttle in an F35 cockpit. The method comprises, in order, the steps of: providing a stationary F35 aircraft having a cockpit with a HOTAS throttle and map case therein, the HOTAS throttle the HOTAS throttle cantilevered upwardly from a proximal end disposed in a cowl to a distal end remote therefrom; removing a flexible cover from the map case, the cover having a shell, the shell having a top layer defining convex outer surface and a bottom layer defining a concave inner surface opposed thereto and defining an irregular perimeter, the irregular perimeter conforming to a throttle of an F35 aircraft and a grid connecting the top layer and the bottom layer; azimuthally orientating the cover to fit on the distal end of HOTAS throttle; and positioning the cover on top of the HOTAS throttle and applying a downward compressive force to removably frictionally engage the cover thereon without external fastening means.

BRIEF DESCRIPTION OF THE DRAWINGS

All drawings are to scale except FIG. 6.

DETAILED DESCRIPTION OF THE INVENTION

Figure 1:
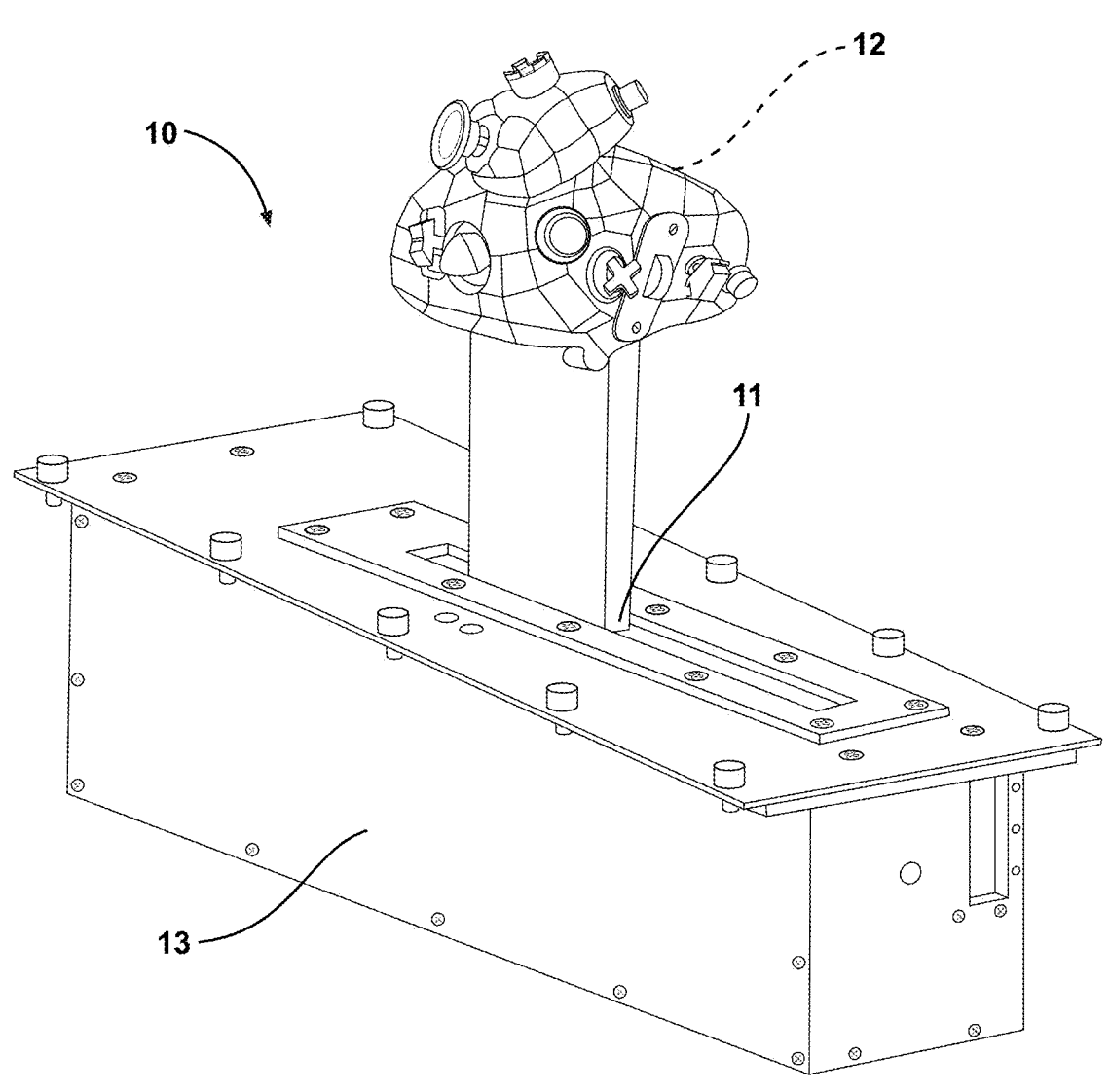
FIG. 1 is a perspective view of a prior art cowl and HOTAS throttle for an F35 aircraft.
Figure 2:
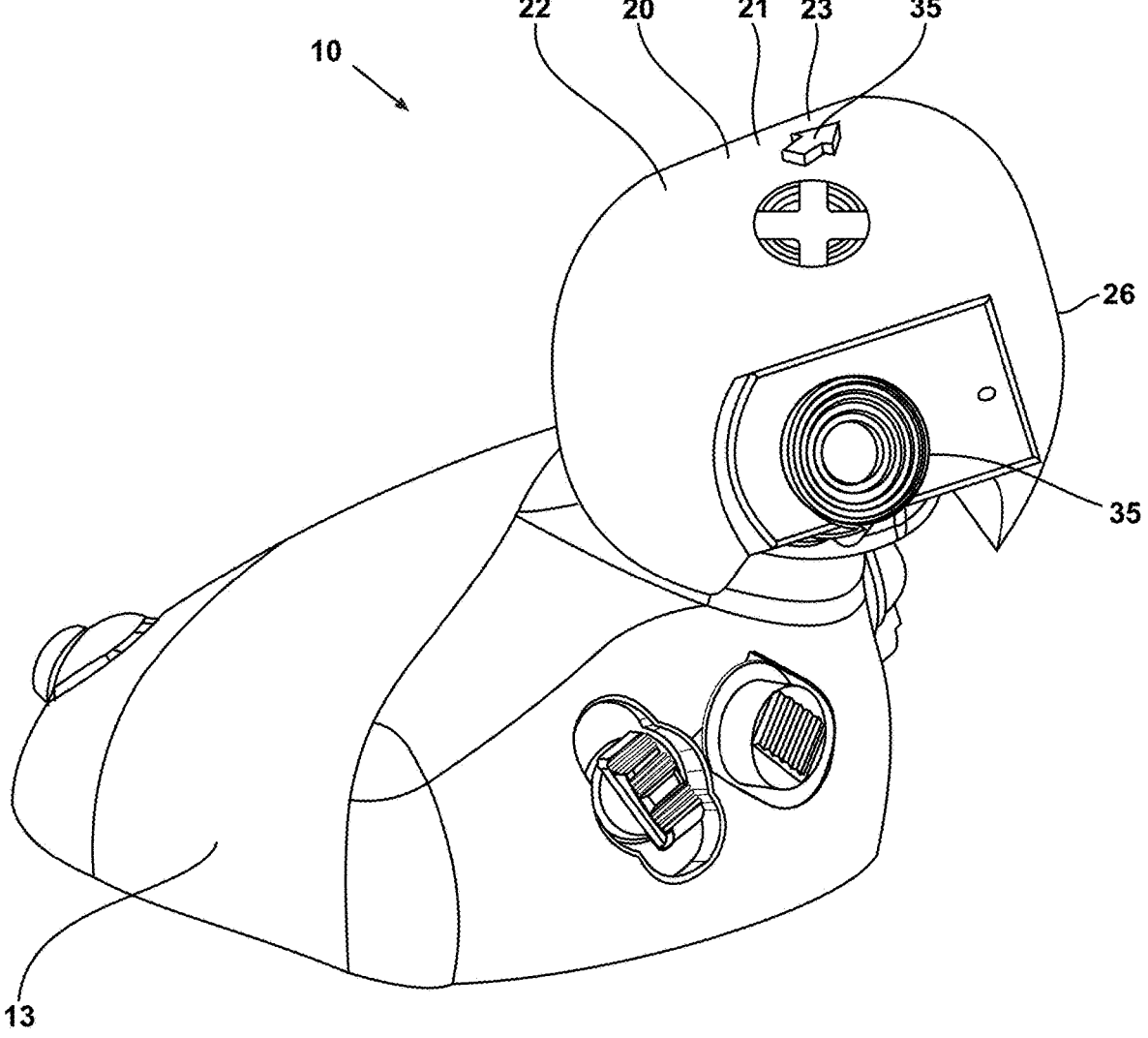
FIG. 2 is a perspective view of a cover according to the present invention installed on a F35 throttle with an alternative cowl.
Figure 3A:
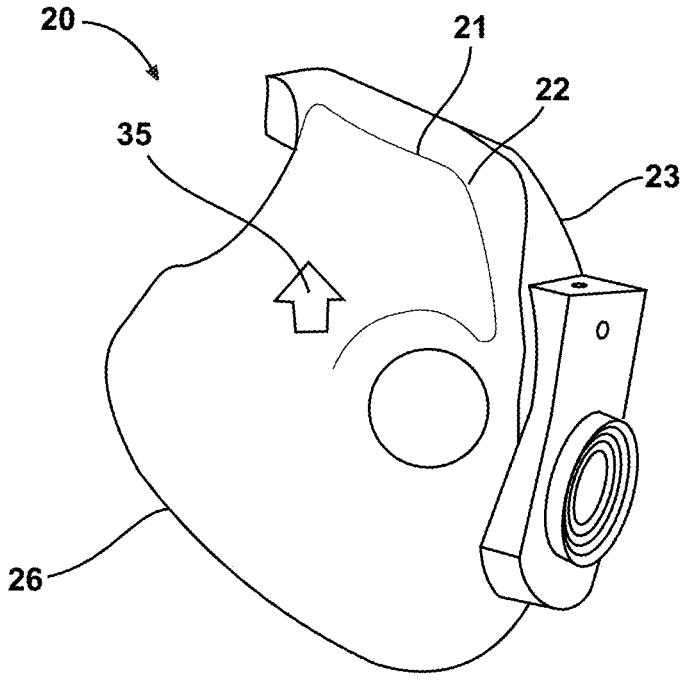
FIG. 3A is a top plan view of a cover according to the present invention.
Figure 3B:
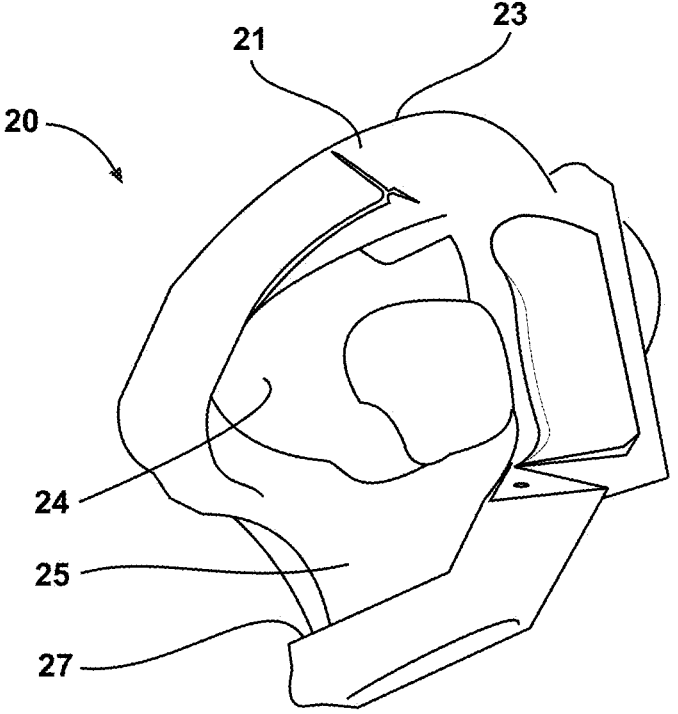
FIG. 3B is a bottom plan view of the cover of FIG. 3A.
Figure 3C:
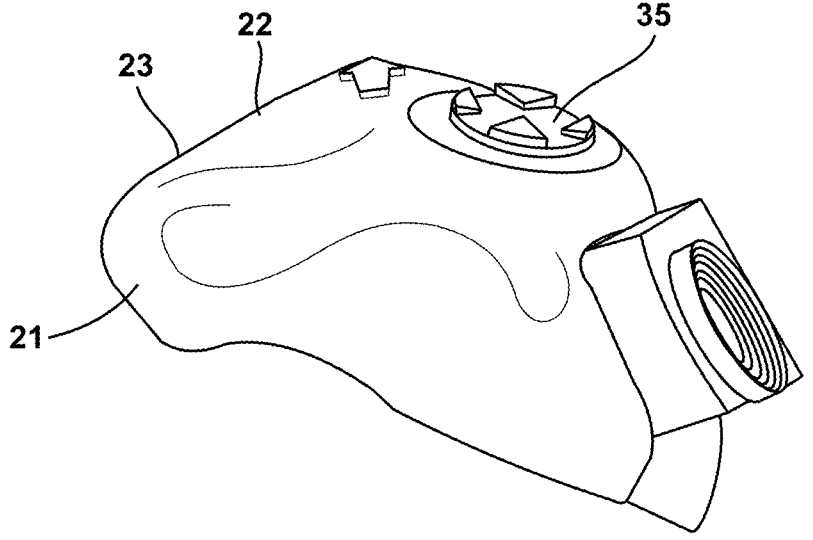
FIG. 3C is a rear elevational view of the cover of FIG. 3A.
Figure 3D:
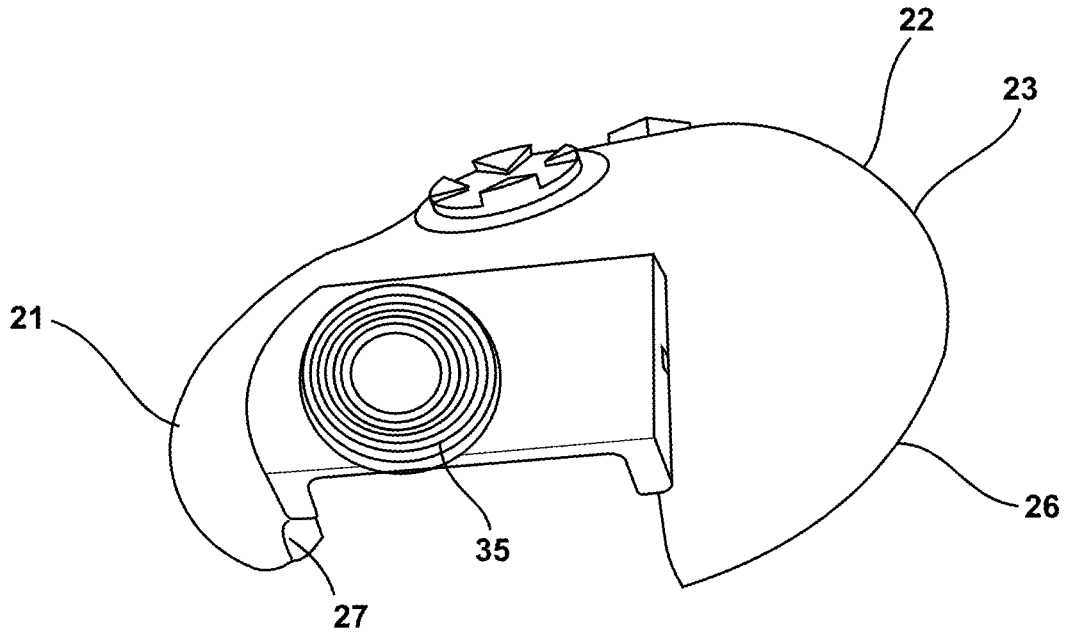
FIG. 3D is a front elevational view of the cover of FIG. 3A.
Figure 3E:
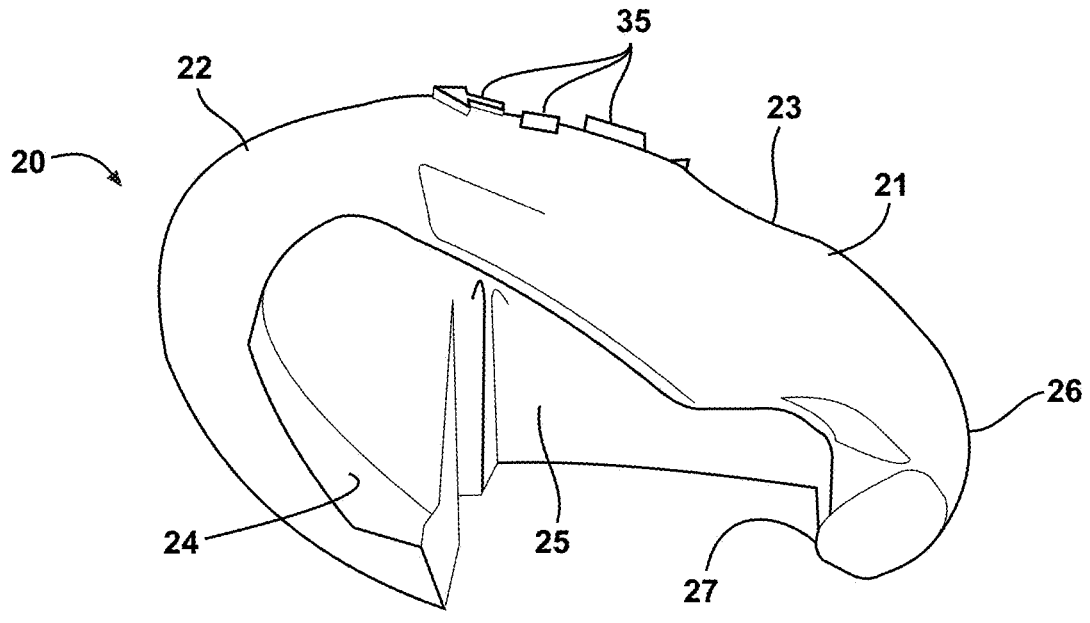
FIG. 3E is a left side profile view of the cover of FIG. 3A.
Figure 3F:
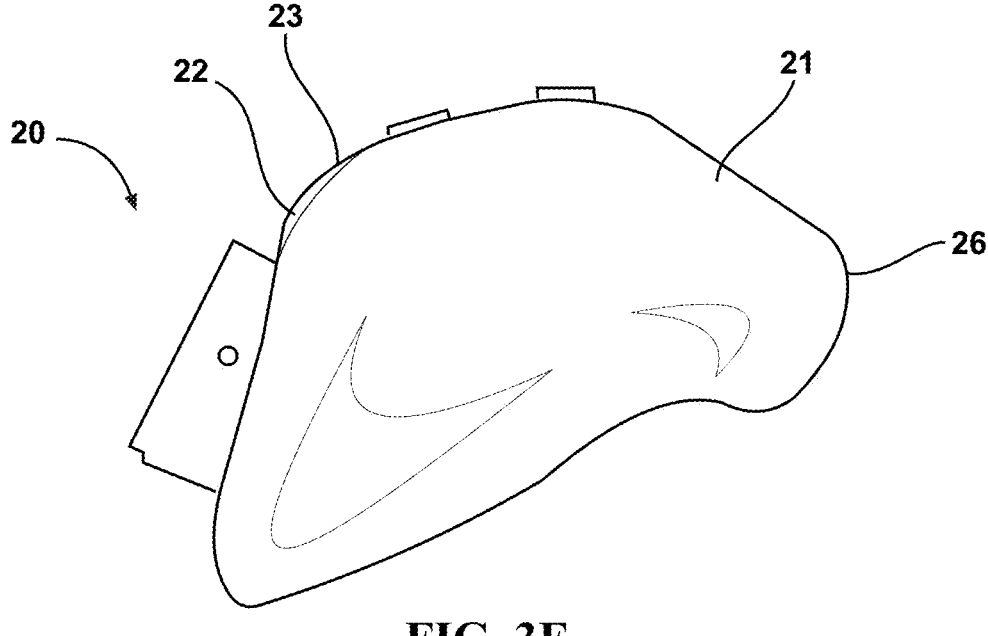
FIG. 3F is a right side profile view of the cover of FIG. 3A.

Referring to FIG. 2, the invention comprises a one-piece protective cover 20 for a HOTAS throttle 10 extending outwardly from a proximal end 11 proximate or within a cowl 13 to a distal end 12 having the HOTAS buttons and switches as described above. The cover 20 is preferably irregularly shaped, so that is can only be installed on the throttle 10 in the correct azimuthal orientation.

Referring to FIGS. 3A-3F, the cover 20 comprises a shell 21 having a bottom layer 24 defining a concave inner surface 25 which faces towards and contacts the top of the throttle 10 while in use and a top layer 22 defining a convex outer surface 23 opposed thereto. The cover 20 preferably has an interior grid 30 connecting the bottom layer 24 and top layer 22.

The cover 20 has an irregular perimeter 26 to conform to the shape of the throttle 10 while covering the respective buttons and switches sought to be protected. By irregular, it is meant that the shape of the perimeter 26 is not a circle, oval or equally sided polygon. This geometry provides for the cover 20 to barely overlay the necessary F35 aircraft 18 throttle 10 buttons and switches without occupying excessive area.

It will be apparent to one of skill that the cover 20 must be removed from the HOTAS throttle 10 during operation of the aircraft. It is highly desirable that the cover 20 be kept with the aircraft, so that it can be immediately and conveniently installed without moving parts or tools upon bringing the aircraft to rest. Preferably the cover 20 can be installed by the pilot before leaving the seat and can be removed by the pilot after being seated for takeoff—all without tools or the cover 20 having any moving parts.

Accordingly, the cover 20 according to the present invention has an undercut so that a lip 27 on, and preferably, circumscribing the perimeter 26. The lip 27 engages and grips under predetermined buttons and/or switches to provide a friction fit of the cover 20 on the top of the throttle 10. This geometry provides the benefit that the cover 20 remains engaged on the throttle 10 while the aircraft is on the ground and maintenance crews have ingress to and egress from the cockpit 15 for routine servicing.

AFI 21-101 requires there be no loose items in the cockpit 15 during flight. Thus, the cover 20 cannot simply be laid about the cockpit 15 during flight. Accordingly, the cover 20 is preferably sized to be placed in the map case 16 of the cockpit 15 during flight and other operations which require use of the throttle 10. The map case 16 is accessible to the pilot with leaving the seat, so that the cover 20 can be deployed before the pilot leaves the seat and protection is immediately available in case the throttle 10 is disturbed during egress of the pilot or ingress of the maintenance crew.

The map case 16 has dimensions of approximately 9 inches×4 inches×10 inches (22.9 cm×10.2 cm×25.4 cm). Accordingly it is necessary that the cover 20 fit into this space for compliance with the aforementioned AFI 21-101. Therefore the cover 20 needs to have at least one dimension less than 4 inches (10.2 cm) to fit in the map case 16 and no dimension greater than 9 inches (22.9 cm).

The size and shape of the cover 20 are significant so that the cover 20 can fit into the map case 16 of the respective aircraft. Preferably the cover 20 does not occupy excessive volume in the map case 16, and more preferably occupies less than 50% of the volume of the map case 16, and more preferably does not occupy more than 25% of the volume of the map case 16, to preserve space for other items.

The cover 20 must exhibit both rigidity and flexibility from −20° F. to 150° F. (−29° C. to 65° C.) during various environmental scenarios. For example, if the aircraft is parked in a freezing climate for an extended period, the cover 20 must be flexible for installation and removal. Likewise, if the aircraft is parked in a hot desert climate for an extended period, the cover 20 must have sufficient resilience to remain on the throttle 10 with a friction fit. The friction fit obviates the need for external fastening means such as hook and loop fasteners, threaded fasteners, adhesive or other external fastening means. Preferably, the cover 20 resists chipping and crumbling to prevent loose debris in the cockpit 15.

To provide that claimed one piece construction and allow use of common materials so that exotic materials, and the attendant expenses, are avoided. Accordingly, the cover 20 may be made of polyurethane plastic, comprising thermoplastic elastomers consisting of linear segmented block copolymers composed of hard and soft segments and particularly macroscopically homogenous thermoplastic polyurethane [TPU]. TPU resin consists of linear polymeric chains in block-structures. Such chains contain low polarity segments which are relatively long (referred to as soft segments), alternating with shorter, high polarity segments (referred to as hard segments). Both types of segments are linked together by covalent links to form block-copolymers. The miscibility of the hard and soft segments in TPU depends on the differences in their glass transition temperature. The TPU material may have a hardness of Shore A 95 +/−1 for the 20% grid 30 density described herein. Prophetically, it is believed that a TPU having a hardness of Shore A 80 to 100 is feasible if the grid 30 density is inversely proportionally compensated.

Alternative materials may include thermoplastic elastomers, expansion foam, rubberized foam, polytetrafluoroethylene, silicone, rubber, neoprene, polyurethane, ethylene propylene diene monomer, rubberized fabrics, and various elastomeric composites. All of the cited materials are believed to provide sufficient flexibility for use with the F35 aircraft 18 throttle 10. Alternative manufacturing methods may include injection molding, over-molding, compression molding, thermoforming, vacuum forming, and dip molding. A TPU cover 20 made by 3D printing has been found suitable.

While a homogenous TPU cover 20 is contemplated for the throttle 10 cover 20 of the present invention, one of skill will recognize the invention is not so limited. If desired the shell 21 of the cover 20 may be heterogeneous. The inner surface 25 of the shell 21 may be made of a flexible material as described above, for frictional engagement with the F35 aircraft 18 throttle 10 cover 20. The outer surface 23 of the shell 21 may be made of a harder material, for foreign object drop protection and shielding. Suitable harder materials for the outer cover 20 to be used with the TPU include rigid plastics.

It is known that 3D printing, also known as additive manufacturing, has a common feature known as infill. Infill provides a grid 30 between opposed solid surfaces to conserve material during manufacture. For the cover 20 according to the present invention, the geometry of the grid 30 should not be left to the default programming of the 3D manufacturing software.

Figure 4:
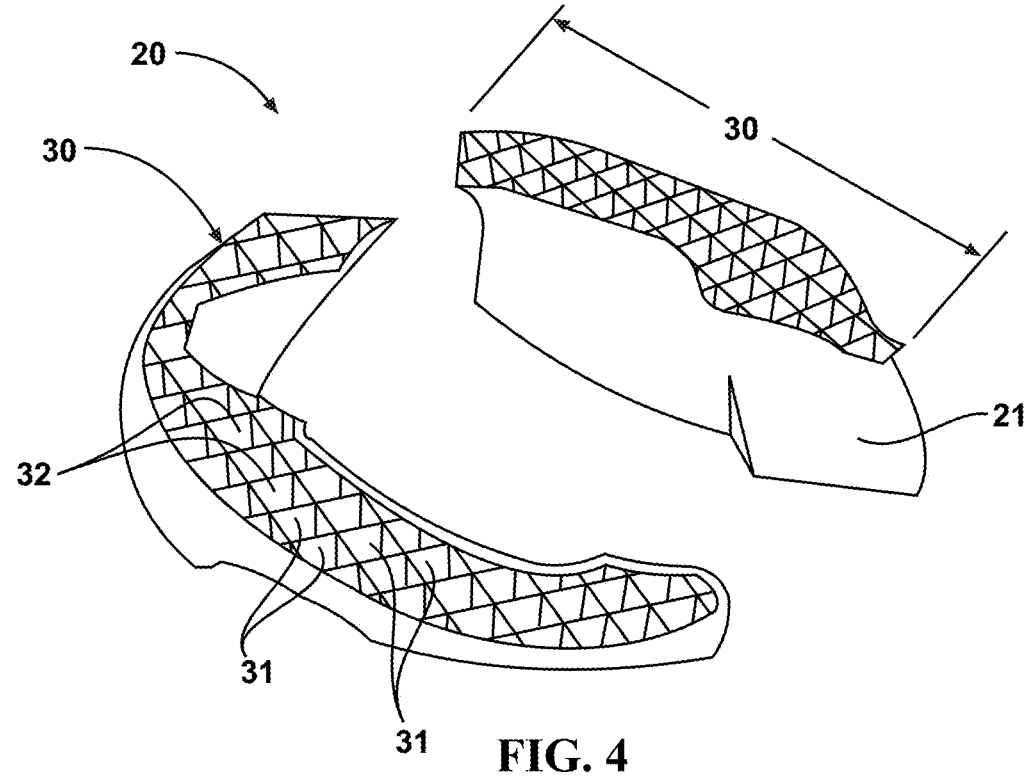
FIG. 4 is a perspective view of a cover shown partially in cutaway and having a 20% grid.

Referring to FIG. 4, the grid 30 joining the top and bottom of the shell 21 is preferably generally orthogonal to the generally plane of the inner surface 25 and outer surface 23. The grid 30 preferably has a diamond-shaped pattern with equally sized cells 32. The web 31 of the grid 30 preferably comprises 20+/−5% of the area of the projected area of the cover 20 with the balance of the projected area being the cells 32 of the grid 30 [referred to herein as a 20% grid 30 density]. The top layer 22 of the shell 21 may have a thickness from the outer surface 23 to the grid 30 of 1+/−0.2 mm. The bottom layer 24 of the shell 21 may have a thickness from the inner surface 25 to the grid 30 of 1+/−0.2 mm. The thickness of the top layer 22 or bottom layer 24 is taken perpendicular to the outer surface 23 or inner surface 25, respectively.

Figure 5:
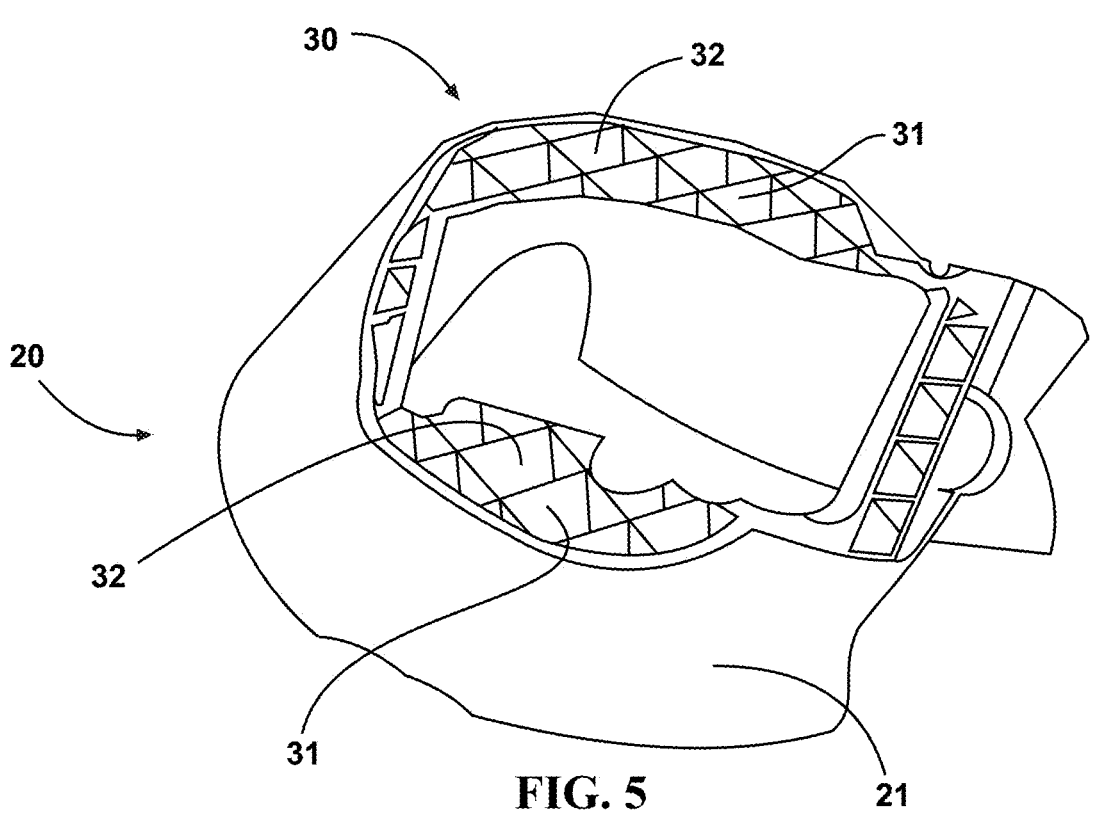
FIG. 5 is a perspective view of a cover shown partially in cutaway and having a 10% grid.

Referring to FIG. 5, it can be seen that a 10% web 31 area [referred to herein as a 10% grid 30 density] yields a cover 20 which is too flimsy and does not have sufficient resilience to remain in place during normal operations. Conversely a 30% grid 30 area yields a cover 20 which is too stiff and is difficult to install and remove.

As shown in Table 1 below, a TPU cover 20 according to the present invention having a Shore A hardness of 95, a top layer 22 and a bottom layer 24 each having a thickness of 1 mm, the 20% grid 30 density is the sweet spot for a cover 20 according to the present invention as is to be deployed in harsh environments on a mockup F35 aircraft 18 HOTAS throttle 10.

TABLE 1

| Grid Density | Empirical Result |
|---|---|
| 10% | Does not provide protection from dropped objects, particularly in warm environments |
| 20% | Suitable for all environments |
| 30% | Cannot be removed from throttle 10 in freezing environment |

Referring back to FIG. 3A, the outer surface 23 of the cover 20, and optionally the inner surface 25 of the cover 20, may be provided with one or more indicia 35. One indicium 35 may designate the particular aircraft, or particular throttle 10 within an airframe, for which the cover 20 is fitted. One indicium 35 may indicate the proper orientation of the cover 20 relative to the forward direction of the aircraft, or other directions thereof as desired. Other indicia 35 may indicate which edge of the perimeter 26 is to be installed first, second, and so on, which portion of the perimeter 26 is to be azimuthally aligned with a particular button/control, removal before flight instructions, instructions to store in the map case 16 and other instructions.

The one or more indicia 35 are preferably integral with the top layer 22 of the cover 20, so as to be made during the manufacturing process without requiring additional steps. Or the indicia 35 can be applied after molding or additive manufacturing is completed.

Figure 6:
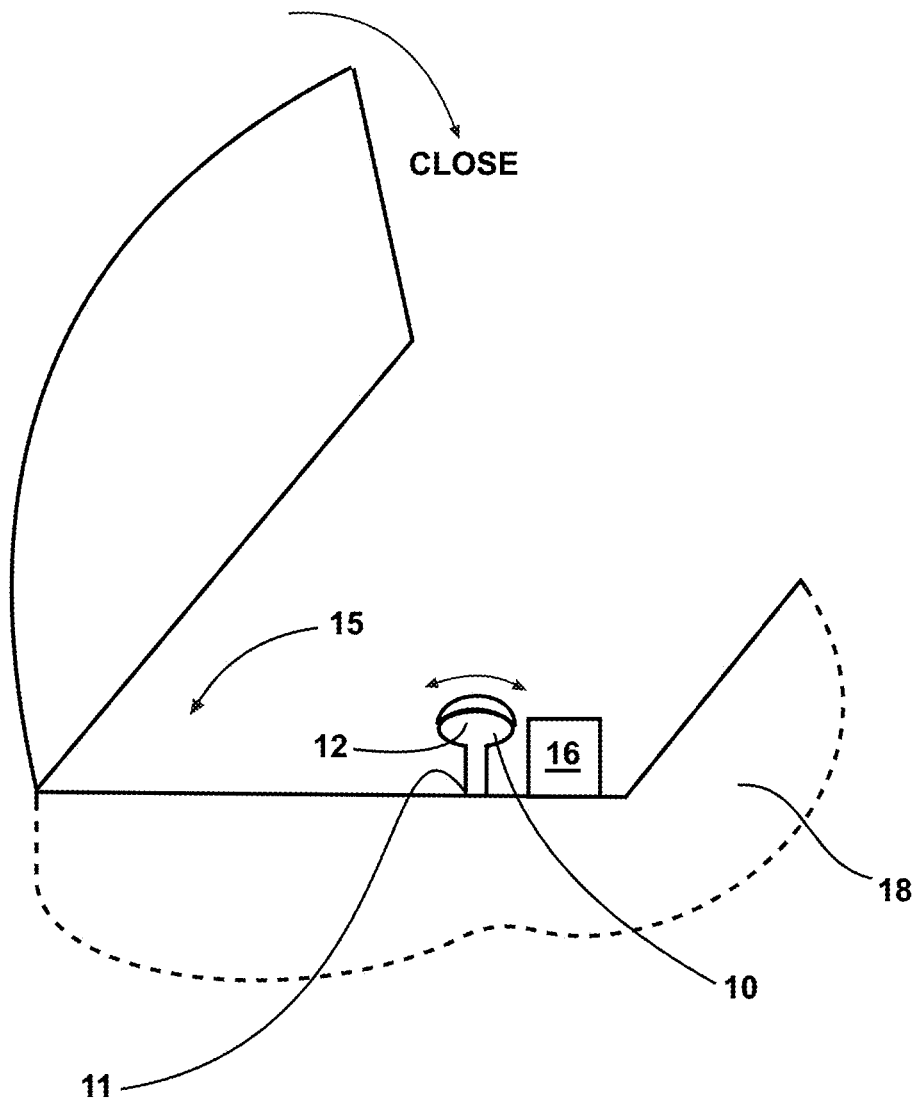
FIG. 6 is a schematic, fragmentary side elevational view of the cockpit of a F35 aircraft with the windscreen open.

Referring to FIG. 6, in operation, the aircraft is stationary (static) and the operator is in the cockpit 15. The cover 20 is removed from the map case 16 in the cockpit 15 or otherwise provided for installation on the HOTAS throttle 10. For installation, the cover 20 is correctly azimuthally oriented, optionally correctly using reference indicia 35. First, a forward-facing arrow positioned on top of the cover 20 may be oriented in the forward direction relative to the aircraft. Additionally, identifying specific switch reference indicia 35 on the outer surface 23 of the cover 20 may be positioned in relation to the control switches.

Once the correct orientation is achieved, the operator applies a compressive downward force to secure the cover 20 in place on the throttle 10. To confirm the cover 20 is securely installed, the operator may lightly attempt to rotate the cover 20 clockwise and counterclockwise on the horizontal plane. The cover 20 should not rotate during this process, signifying that it is fully seated and properly installed on the throttle 10.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range of that same parameter. That is the upper limit of one range may be used with the lower limit of another range for the same parameter, and vice versa. As used herein, when two components are joined or connected the components may be interchangeably contiguously joined together or connected with an intervening element therebetween. A component joined to the distal end of another component may be juxtaposed with or joined at the distal end thereof. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. A cover for a HOTAS throttle and comprising:
a shell, the shell having a top layer defining an outer surface and a bottom layer defining a concave inner surface opposed thereto and defining an irregular perimeter, the irregular perimeter conforming to a throttle of an aircraft; and
a grid connecting the top layer and the bottom layer.

2. A cover according to claim 1 comprising TPU throughout, the TPU having a hardness of Shore A 95+/−1.

3. A cover according to claim 1 wherein the grid has a web defining a diamond-shaped pattern.

4. A cover according to claim 1 where the top layer has a convex outer surface.

5. A cover according to claim 1 wherein the TPU is homogenous throughout the shell.

6. A cover according to claim 5 further comprising an indicium on the outwardly facing surface and being integral with the top layer of the shell.

7. An aircraft cockpit having an operable HOTAS throttle therein and comprising:
a HOTAS throttle for controlling operation of the aircraft without removal of the pilot's hand therefrom, the HOTAS throttle extending upwardly from a proximal end disposed in a cowl to a distal end remote therefrom, the distal end of the of the throttle having a cover removably disposed thereon, the cover comprising a shell having a top layer defining convex outer surface and a bottom layer, the bottom layer defining a concave inner surface opposed thereto and defining an irregular perimeter, the irregular perimeter fitting over a throttle of an aircraft; and a grid connecting the top layer and the bottom layer.

8. An aircraft cockpit having an operable HOTAS throttle according to claim 7 wherein the removably disposed cover is frictionally engaged with the distal end of the throttle.

9. An aircraft cockpit having an operable HOTAS throttle according to claim 8 wherein the grid of the removably disposed cover comprises TPU.

10. An aircraft cockpit having an operable HOTAS throttle according to claim 8 wherein the removably disposed cover comprises TPU throughout.

11. An aircraft cockpit having an operable HOTAS throttle according to claim 7 wherein the removably disposed cover has at least one dimension less than 10.2 cm and no dimension greater than 22.9 cm.

12. An aircraft cockpit having an operable HOTAS throttle according to claim 11 wherein the removably disposed cover is free of hook and loop fasteners, threaded fasteners and adhesive.

13. A method of protecting a HOTAS throttle in a cockpit of an aircraft, the method comprising, in order, the steps of:
providing a stationary aircraft having a cockpit with a HOTAS throttle and map case therein, the HOTAS throttle the HOTAS throttle cantilevered upwardly from a proximal end disposed in a cowl to a distal end remote therefrom;
removing a flexible cover from the map case, the cover having a shell, the shell having a top layer defining convex outer surface and a bottom layer defining a concave inner surface opposed thereto and defining an irregular perimeter, the irregular perimeter conforming to a throttle of an aircraft and a grid connecting the top layer and the bottom layer;
orientating the cover to fit on the distal end of HOTAS throttle; and
positioning the cover on top of the HOTAS throttle and applying a downward compressive force to removably engage the cover thereon without external fastening means.

14. A method according to claim 13 wherein the map case has dimensions of about 22.9 cm×10.2 cm×25.4 cm and the cover has at least one dimension less than 10.2 cm and no dimension greater than 22.9 cm.

15. A method according to claim 13 wherein the step of removably engaging the cover on the HOTAS throttle occurs before a pilot exits the cockpit of the aircraft.

16. A method according to claim 15 wherein the step of orientating the cover comprises the steps of:
providing a first indicium on the outer surface of the cover designating a direction of the cockpit; and
aligning the first indicium with the direction of the cockpit.

17. A method according to claim 15 wherein the irregular perimeter of the cover comprises a lip thereon and the outer surface of the cover comprises a secondary indicium indicating which portion of the lip is to be first installed on the HOTAS throttle.

18. A method according to claim 15 wherein the bottom layer of the cover is made of TPU having a Shore A hardness of 95+/−1.

19. A method according to claim 18 wherein the grid layer is made of TPU having a Shore A hardness of 95+/−1.

20. A method according to claim 15 further comprising the step of disengaging the cover from the HOTAS throttle to remove the cover therefrom.

* * * * *